US 7,712,090 B2

(12) United States Patent
Stuefe

(10) Patent No.: US 7,712,090 B2
(45) Date of Patent: May 4, 2010

(54) PARALLEL COMPILING WITH A SERIAL SCHEDULER

(75) Inventor: Thomas Stuefe, Gailberg (DE)

(73) Assignee: SAP Aktiengesellschaft, Walldorf (DE)

( * ) Notice: Subject to any disclaimer, the term of this patent is extended or adjusted under 35 U.S.C. 154(b) by 871 days.

(21) Appl. No.: 10/360,531

(22) Filed: Feb. 7, 2003

(65) Prior Publication Data
US 2003/0200536 A1 Oct. 23, 2003

(30) Foreign Application Priority Data
Feb. 7, 2002 (EP) .................................. 02002801

(51) Int. Cl.
*G06F 9/45* (2006.01)
*G06F 9/44* (2006.01)
(52) U.S. Cl. ........................ 717/149; 717/103; 717/119; 717/162
(58) Field of Classification Search ................. 717/119, 717/140, 149; 718/102
See application file for complete search history.

(56) References Cited

U.S. PATENT DOCUMENTS

| | | | |
|---|---|---|---|
| 4,951,192 A | | 8/1990 | Chase, Jr. et al. |
| 5,319,778 A | * | 6/1994 | Catino ........................ 707/102 |
| 5,522,070 A | * | 5/1996 | Sumimoto ................... 718/104 |
| 5,524,242 A | * | 6/1996 | Aida et al. ................... 717/149 |
| 5,524,244 A | * | 6/1996 | Robinson et al. ............ 717/140 |
| 5,797,012 A | * | 8/1998 | Blainey et al. .............. 717/157 |
| 6,321,373 B1 | | 11/2001 | Ekanadham et al. ........ 717/119 |
| 6,487,577 B1 | * | 11/2002 | Sundararajan .............. 718/102 |
| 6,507,947 B1 | * | 1/2003 | Schreiber et al. ........... 717/160 |
| 6,622,301 B1 | * | 9/2003 | Hirooka et al. ............. 717/149 |
| 6,681,388 B1 | * | 1/2004 | Sato et al. ................... 717/159 |
| 2001/0042189 A1 | * | 11/2001 | Babaian et al. ............... 712/23 |
| 2003/0005025 A1 | * | 1/2003 | Shavit et al. ................ 709/102 |
| 2003/0014739 A1 | * | 1/2003 | Aubertine ................... 717/149 |

FOREIGN PATENT DOCUMENTS

EP 0859314 A2 8/1998

OTHER PUBLICATIONS

"A compiler method for the parallel execution of irregular reductions in scalable shared memory multiprocessors", Gutierrez et al., May 2000, pp. 78-87. Online retrieved at <http://delivery.acm.org/10.1145/340000/335239/p78-gutierrez.pdf>.*

"Basic compiler algorithms for parallel programs", Lee et al., Aug. 1999, pp. 1-12. Online retrieved at <http://delivery.acm.org/10.1145/310000/301105/p1-lee.pdf>.*

(Continued)

*Primary Examiner*—Tuan Q Dam
*Assistant Examiner*—Thuy Dao
(74) *Attorney, Agent, or Firm*—Fish & Richardson P.C.

(57) ABSTRACT

Methods and apparatus, including computer program products, for generating an executable program, including receiving serial compile commands in a pseudo-compiler to compile source code modules, scheduling the serial compiler commands in parallel compilers to compile the source code modules, compiling the source code modules in the parallel compilers to generate object code modules, sending compiler completion acknowledgements to a synchronizer and linking the object code modules in linkers in response to linker initiation commands from the synchronizer.

24 Claims, 7 Drawing Sheets

OTHER PUBLICATIONS

"Language and Compiler Support for Adaptive Distributed Applications", Aug. 2001, Adve et al., pp. 238-246. Online retrieved at <http://delivery.acm.org/10.1145/390000/384229/p238-adve.pdf>.*

"A parallel compiler scheduler", Solar et al., Nov. 2001, pp. 256-263. Online retrieved at <http://ieeexplore.ieee.org/stamp/arnumber=972655&isnumber=20960>.*

Erik H. Baalbergen, "Parallel and Distributed Compilations in Loosely-Coupled Systems: A Case Study", Department of Mathematics and Computer Science, Vrije Universiteit, Amsterdam, The Netherlands, p. 268-273.

Charles J. Fleckenstein and David Hemmendinger, "Using a Global Name Space for Parallel Execution of UNIX Tools", Communications of the ACM, vol. 32, pp. 1085-1090, (1989).

IBM Technical Disclosure Bulletin "Distributed Parallel Build System for Hierarchy Organized Large Scale Software Systems" vol. 39 pp. 63-68(1996).

V. Ramji and Timothy Gonsalves, "Distributed and Optimistic Make: Implementation and Performance" Department of Computer Science and Engineering, Indian Institute of Technology, Madras, India pp. 531-538, (1992).

http://jnipp.sourceforge.net.

* cited by examiner

| Time | P 160<br>FIFO 327 | C 321 | C 322 |
|---|---|---|---|
| 1 | C | B | A |
| 2 | D C | B | A |
| 3 | D | B | C |
| 4 | H G F E | B | D |
| ⋮ | ⋮ | | |
| 20 | Z Y | U | X |

FIG. 5

PARALLEL COMPILING WITH A SERIAL SCHEDULER

CROSS-REFERENCE TO RELATED APPLICATIONS

This application claims priority to European Patent Application No. 02002801.5, filed Feb. 7, 2002, entitled PROVIDING TARGET PROGRAM BY PARALLEL COMPILING WITH SERIAL SCHEDULE, the disclosure which is incorporated herein by reference in its entirety.

BACKGROUND

The present invention relates to data processing by digital computer, and more particularly to parallel compiling with a serial schedule.

Software source code can be written in programming languages such as C, C++, Pascal, or Java®. In one common deployment scenario, a compiler converts software source code into object code, and a linker converts the object code into executable code. At run-time, a processor executes the executable code.

Modular techniques are common in software development, and software building is a process of compiling source code modules to object code modules and linking the object code modules to the target program. This modular process automatically follows a predefined schedule. However, for business application software, the total processing time is measured in hours.

There is an ongoing need to improve software development techniques with reduced processing times.

SUMMARY

The present invention provides methods and apparatus, including computer program products, for parallel compiling with a serial schedule.

In general, in one aspect, the invention features a method of generating an executable program including receiving serial compile commands in a pseudo-compiler to compile source code modules, scheduling the serial compiler commands in parallel compilers to compile the source code modules, compiling the source code modules in the parallel compilers to generate object code modules, sending compiler completion acknowledgements to a synchronizer, and linking the object code modules in linkers in response to linker initiation commands from the synchronizer.

The invention can be implemented to include one or more of the following advantageous features. The pseudo-compiler can store the serial compiler commands in a buffer. The serial compiler commands can be scheduled according a size of the source code modules, an expected compiler duration in each parallel compiler, a next available compiler, a first-in-first-out (FIFO) scheme, a last-in-first-out (LIFO) scheme, a head or stack configuration.

The compiler completion acknowledgements can indicate error-free compilations. Receiving serial compile commands can include storing a count of a serial compiler commands to determine a number of parallel compilers.

The details of one or more implementations of the invention are set forth in the accompanying drawings and the description below. Further features, aspects, and advantages of the invention will become apparent from the description, the drawings, and the claims.

DESCRIPTION OF DRAWINGS

FIG. 5 is a block diagram of a trigger buffer.

DETAILED DESCRIPTION

Figure 1:
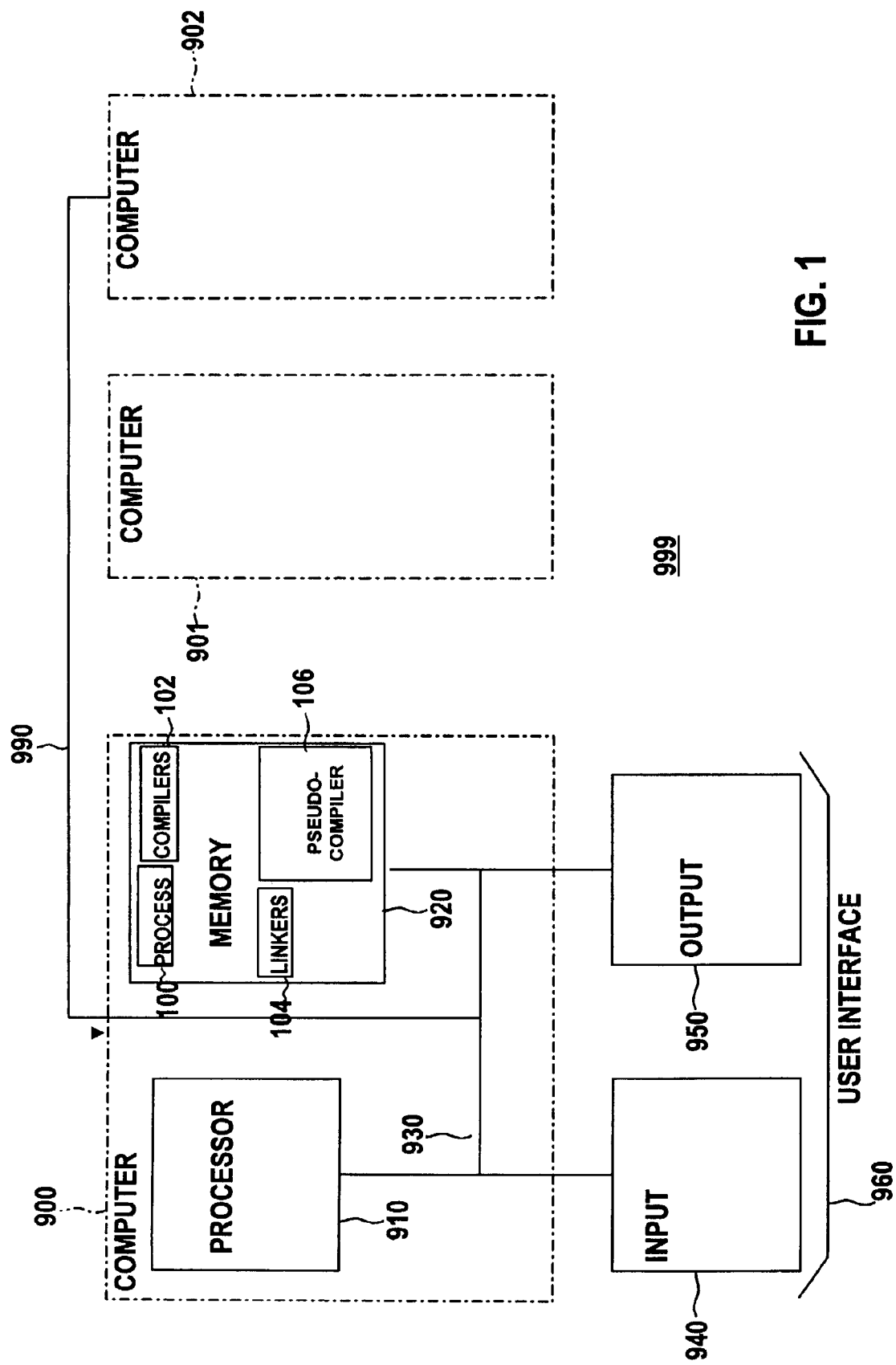
FIG. 1 is a block diagram of a system including an implementation of the invention.

Shown FIG. 1, an exemplary system 999 includes computers 900, 901, 902. Computers 900, 901, 902 are coupled by inter-computer network 990. Computer 900 includes processor 910, memory 920, bus 930, input device 940 and output device 950. Input device 940 and output device 950 make up a user interface 960. In operation, memory 920 includes a process 100, compilers 102, linkers 104 and pseudo-compiler 106. Computers 901, 902 are sometimes referred to as remote computers. Example remote computers are servers and routers.

In one example, computer 900 is a personal (PC) computer. In other examples, computer 900 is a hand-held device, a multiprocessor computer, a pen computer, a microprocessor-based or programmable consumer electronics, a minicomputer, a mainframe computer, a personal mobile computing device, a mobile phone, a portable or stationary personal computer, or a palmtop computer.

Figure 2:
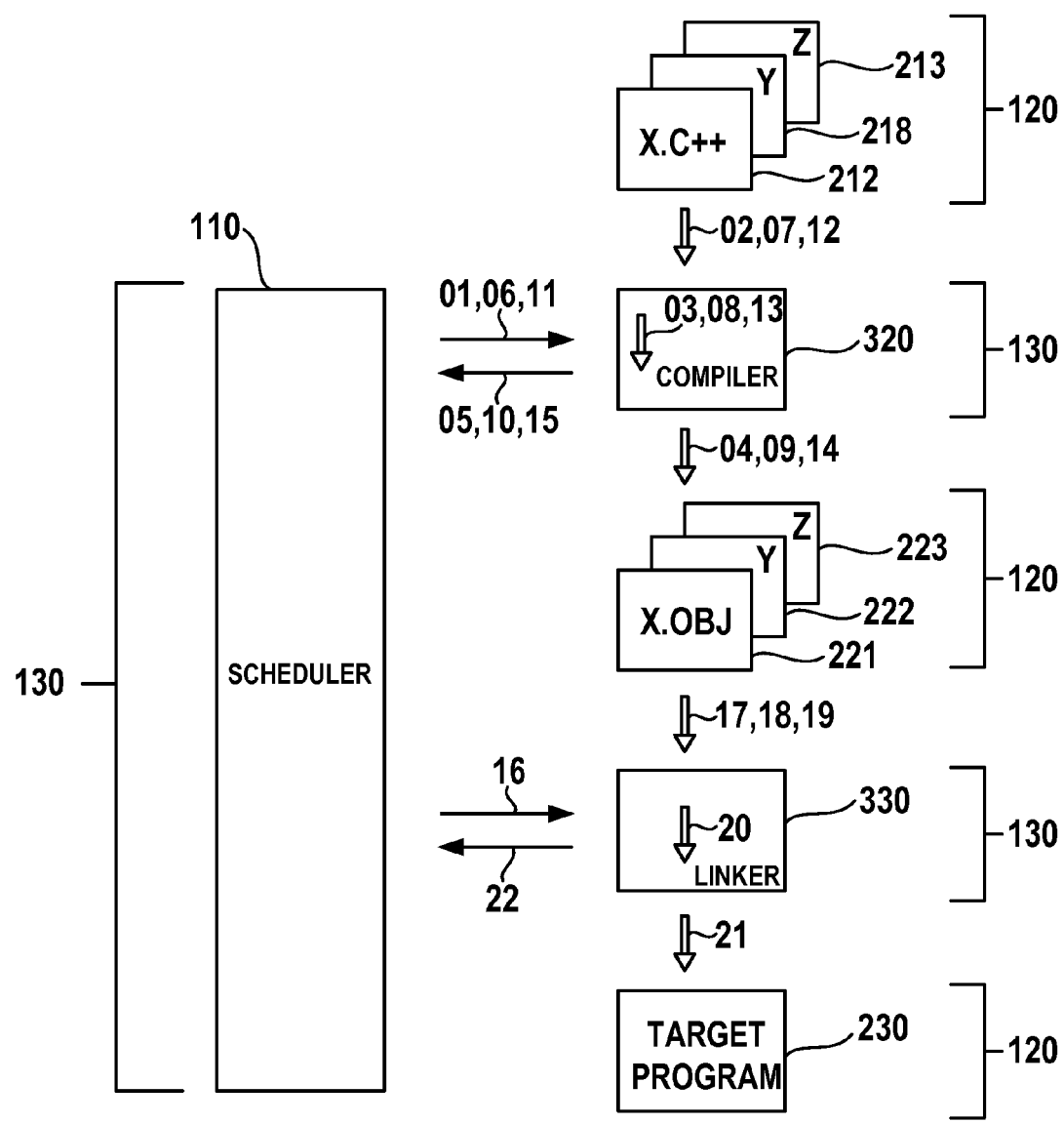
FIG. 2 is a block diagram of code modules and service components.

In FIG. 2, an overview of code modules 120 and service components 130 is shown. Code modules 120 are classified into source code modules 211 (X.C++), 212 (Y.C++), 213 (Z.C++), object code modules 221 (X.OBJ), 222 (Y.OBJ), 223 (Z.OBJ), and target program 230. Exemplary filenames are given in parenthesis with a module identifier (e.g., X) and a code identifier (e.g., C++). For convenience, the word "code" is sometimes omitted.

According to their main actions (i.e., two-digit numbers), the service components 130 are classified into the scheduler 110 (S, "maker") for triggering 01, 06, 11, 16 (i.e. requesting), the compiler (C) 140 for reading 02, 07, 12, compiling 03, 08, 13, writing 04, 09, 14, acknowledging 05, 10, 15, and the linker (L) 150 for reading 17, 18, 19, linking 20, writing 21, acknowledging 22.

Double-line arrows represent actions that involve code, such as reading and writing, compiling and linking. Single-line arrows represent actions that control operations, such as triggering and acknowledging.

Scheduler 110 triggers compiler 140 and linker 150 according to a predefined schedule with the module identifiers (i.e. X, Y, Z). One triggering action is referred to as "trigger command" ("request"). Compiler 140 and linker 150 acknowledge completion to scheduler 110 (i.e. indicate that compiling or linking has been completed).

Compiler 140 reads source code from source modules 211, 212, 213 (e.g., X.C++), compiles source code to object code, and writes object code to the object modules 221, 222, 223 (e.g., X.OBJ).

Linker 150 reads object modules 221, 222, 223 (i.e., X.OBJ, Y.OBJ and Z.OBJ) and links them to target program 230.

In one example, processor 910 executes the compiler 140 sequentially as follows.

```
01 S triggers C to compile X
02 C reads source from X.C++
03 C compiles
04 C writes object to X.OBJ
05 C acknowledges
06 S triggers C to compile Y
07 C reads source from Y.C++
08 C compiles
09 C writes object to Y.OBJ
10 C acknowledges
11 S triggers C to compile Z
12 C reads source from Z.C++
13 C compiles
14 C writes object to Z.OBJ
15 C acknowledges
16 S triggers L to link X, Y and Z
17 L reads X.OBJ
18 L reads Y.OBJ
19 L reads Z.OBJ
20 L links X.OBJ, Y.OBJ and Z.OBJ
21 L writes to TARGET.exe
22 L acknowledges.
```

Scheduler 110 includes instructions in a schedule file ("make file"), for example, for action 1 (trigger C to compile X), action 5 (wait for acknowledgement), and action 6 (trigger C to compile Y).

Attempts to speed up the above actions can face problems. For example, linker 150 evaluates object code for some or all modules (i.e. X, Y and Z) simultaneously. Therefore, changing the schedule (e.g., compile X, compile Y, link X and Y, compile Z, link XY with Z) can be applied to modules with no interaction. Also, compiling sometimes fails (e.g., due to syntax errors in source code).

Disregarding compiler errors, process 100 uses a pseudo-compiler that triggers parallel compilers. In another example process 100 uses buffers for temporarily storing trigger commands. In still another example, process 100 adds error detection functionality. In another example, process 100 accommodates a variable, but initially unknown number of modules.

Figure 3:
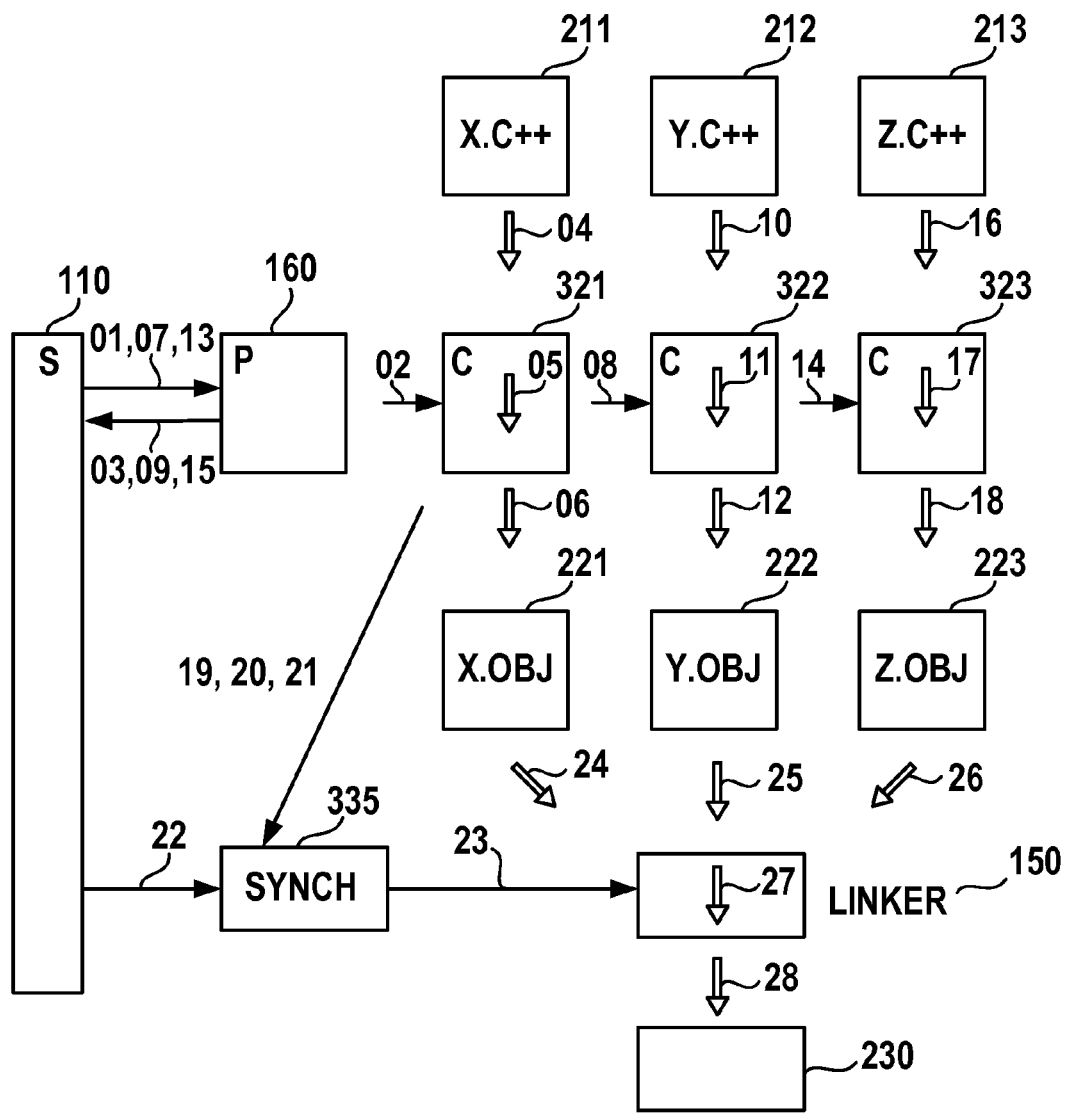
FIG. 3 is a block diagram of a first example using the code modules and service components.

In FIG. 3, code modules 120 and service components 130 are shown in greater detail. Compiler 140 is replaced with pseudo-compiler 160. Pseudo-compiler 160 triggers compiler 321, 322, 323 to operate in a substantially parallel manner. A synchronizer 335 is also included. Pseudo-compiler 160 appears to scheduler 110 like compiler 320. Thus, it is not required to change the schedule or to change triggering or acknowledging.

In operation, scheduler 110 triggers 01 pseudo-compiler 160 to compile X. Pseudo-compiler 160 triggers 02 compiler 321. Substantially simultaneously, (i) pseudo-compiler 160 acknowledges 03 to scheduler 110 and (ii) compiler 321 staffs to read 04 source module 211, compile 05, and write 06 object module 221. For scheduler 110, it appears that compiling has been completed so that scheduler 110 triggers 07 pseudo-compiler 160 to compile Y. Similar, pseudo-compiler 160 triggers 08 compiler 322. Substantially simultaneously, (i) pseudo-compiler 160 acknowledges 09 to scheduler 110 and (ii) compiler 322 starts to read 10 source module 212, compile 11, and write 12 object module 222.

Again, for scheduler 110, it appears that compiling has been completed so that scheduler 110 triggers 13 pseudo-compiler 160 to compile Z. Similar, pseudo-compiler 160 triggers 14 compiler 323. Substantially simultaneously, (i) pseudo-compiler 160 acknowledges 15 to scheduler 110 and (ii) compiler 323 starts to read 16 source module 213, compile 17, and write 18 object module 223. Pseudo-compiler 160 uses serial scheduling to operate parallel compilers. Compilers 321, 322, 323 independently compile 05, 11, 17 and acknowledge 19, 20, 21 to synchronizer 335.

Synchronizer 335 enhances the interaction of the scheduler 110 and linker 150. Synchronizer 335 enables scheduler 110 to trigger linker 150 or disables it. Synchronizer 335 either forwards trigger commands or blocks them. When compilers 321, 322, 323 have acknowledged 19, 20, 21 (events related by logical AND), scheduler 110 triggers 22/23 linker 150. Linker 150 reads 24, 25, 26 object modules 221, 222, 223, links 27 them and writes 28 target program 230.

In another example, linker 150 and synchronizer 335 act like a pseudo-linker that appears to scheduler 110 as a linker.

Pseudo-compiler 160 and synchronizer 335 operate like a dispatcher that organizes parallel code processing (compiling/linking) from a serial schedule.

Usually, compilers 321, 322, 323 need different time intervals to complete compiling 05, 11, 17. These differences are caused, for example, by different sizes of modules 211, 212, 213 or by different compiler environments. In order to reduce idle times, process 100 uses buffers.

Figure 4:
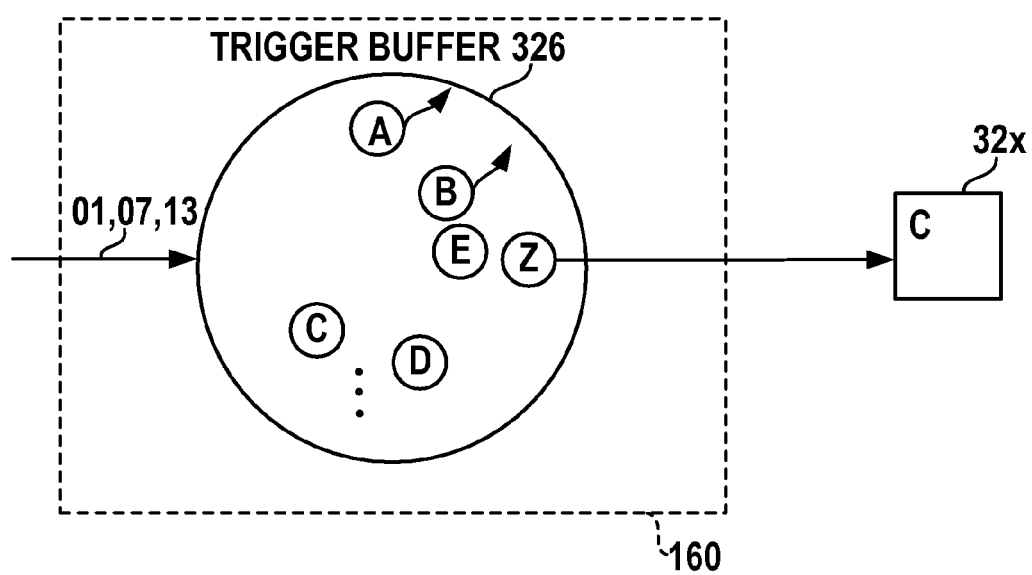
FIG. 4 is a block diagram of a compiler trigger queue in a first-in-first-out (FIFO) configuration for a second embodiment.

As shown in FIG. 4 and FIG. 5, the pseudo-compiler 160 includes buffers 326, 327. Trigger commands (from scheduler 110) are symbolized by letter symbols A, B, . . . T, U, V, W, X, Y, Z that identify source modules to be compiled. Buffer 326 can forward the commands (arrow symbols) as predefined, for example, according to the size of the source modules to be compiled, according to an expected compiling duration for each compiler, or to the next available compiler. Buffer 326 can forward the commands according to a first-in-first-out (FIFO) scheme, according to a last-in-first-out (LIFO) scheme, or in a head or stack configuration.

As shown in FIG. 4, buffer 326 stores trigger commands (01, 07, 13) at random and further triggers compilers (C) 321, 322 or 323 (shown as 32x). Pseudo-compiler 160 is symbolized by a dashed frame.

In FIG. 5, a compiler trigger buffer in a first-in-first-out (FIFO) configuration is shown. Trigger A arrives first. Waiting triggers are temporarily stored in a queue. The figure has the form of a table, in which the columns indicate consecutive time points, FIFO with triggers arriving on the left, indication of modules currently compiled by compiler 321, and indication of modules currently compiled by compiler 322.

At time point 1, triggers for modules A and B are forwarded through the FIFO so that compilers 322 and 321 compile modules A and B, respectively. Trigger C is in the FIFO. At time point 2, trigger D has arrives and compilers 321 and 322 are still busy. At time point 3, compiler 321 is compiling module B, compiler 322 is compiling C, D is in the FIFO. At time point 4, compiler 321 is compiling module B, compiler 322 is compiling D, triggers H, G, F, E are waiting in the FIFO. At the next time points, further triggers arrive, compilers 321 and 322 operate on further modules. At time point 20, compiler 321 and 322 compile modules U and X, respectively. The last triggers Y and Z are in the FIFO.

In another example, error handling functionality is applied to pseudo-compilers, compilers, synchronizer and linker. Acknowledging can be delayed until compiling is completed without errors. Compiling modules that have errors can be shifted to a time when human interaction is available (e.g., in an overnight schedule to the next morning).

Figure 6:
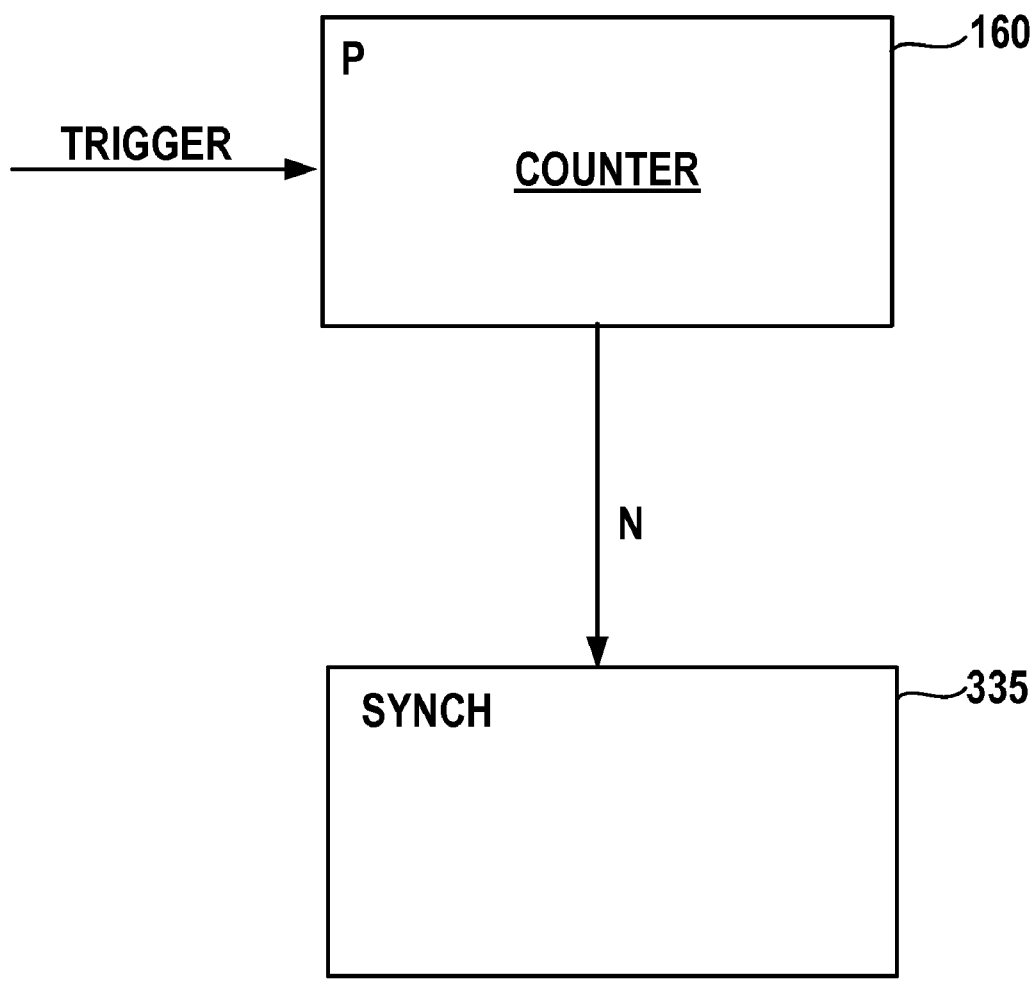
FIG. 6 is a block diagram of a pseudo-compiler and a synchronizer.

As shown in FIG. 6, pseudo-compiler 160 counts the total number N of triggering commands (incoming arrow) and communicates N to synchronizer 335 (outgoing arrow). This is convenient for a case with a variable number of modules. Counting makes compiling and linking more flexible.

Figure 7:
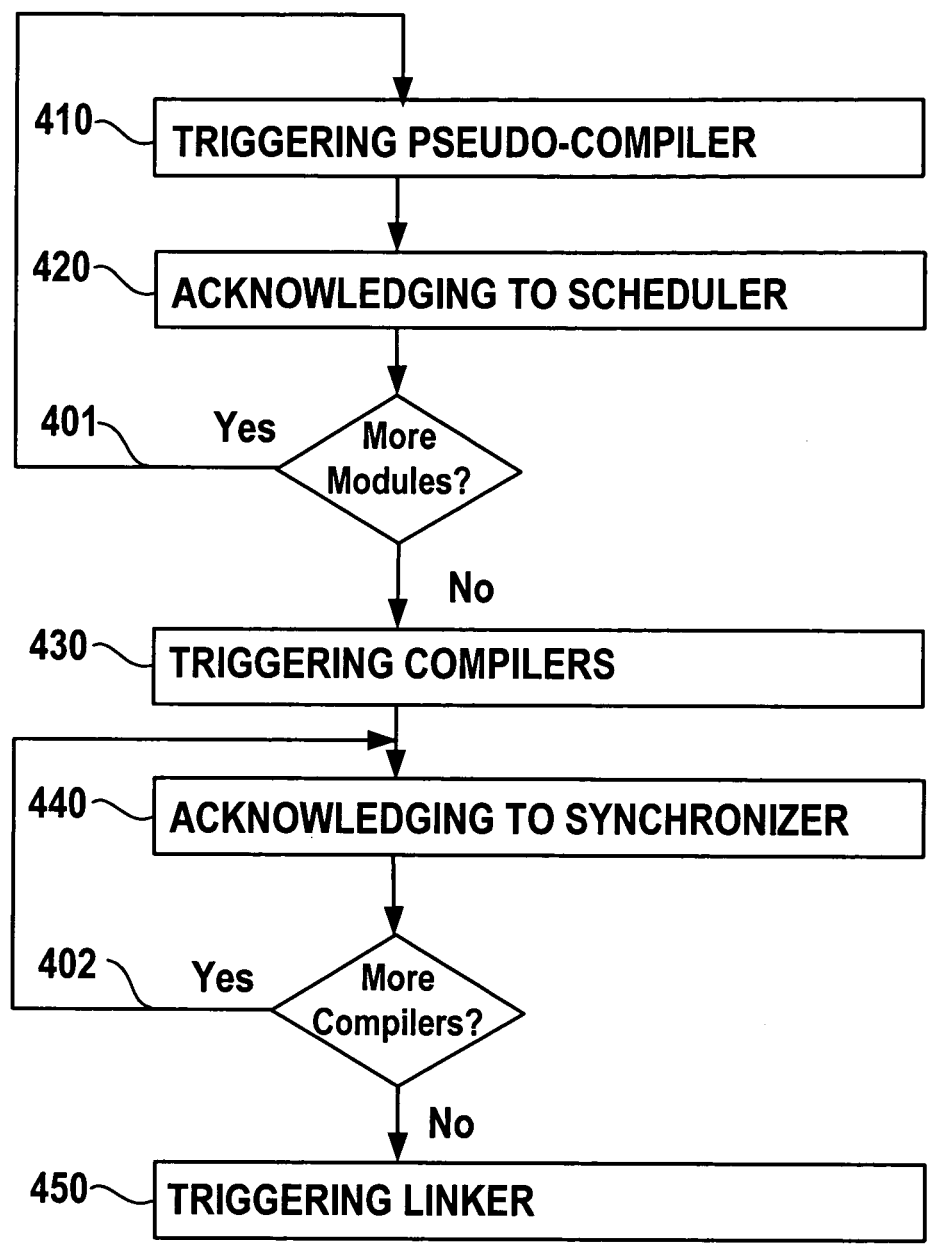
FIG. 7 is a flow chart of a process.

As shown in FIG. 7, process 100 for controlling a building process of target program 230 (with compiling source code modules 211, 212, 213 into object code modules 221, 222, 223 and linking object code modules 221, 222, 223 to target program 230) includes triggering (410) pseudo-compiler, acknowledging (420) to scheduler, triggering (430) compilers, acknowledging (440) to synchronizer; and triggering (450) linker. Triggering (410) and acknowledging (420) are repeated for a number of modules/compilers (indicated by query 401, 402).

In triggering (410), scheduler 110 triggers 01, 07, 13 each module of pseudo-compiler 160. In acknowledging (420), pseudo-compiler 160 acknowledges 03, 09, 15 receipt to scheduler 110. In triggering (430), pseudo-compiler 160 triggers 02, 08, 14 a number of compilers 321, 322, 323 to compile 05, 11, 17 source code modules 211, 212, 213 to object code modules 221, 222, 223 substantially in parallel. In acknowledging (440), compilers 321, 322, 323 acknowledge 19, 20, 21 to synchronizer 335. In triggering (450), scheduler 110 triggers 22/23 linker 150 when the synchronizer 335 has received acknowledgements 19, 20, 21 from compilers 321, 322, 321. It is preferred that the total number N of triggering commands 01, 07, 13 is counted and communicated to synchronizer 335, and pseudo-compiler 160 buffers trigger commands.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of generating an executable program comprising:
receiving from a scheduler compile commands, in serial order, in a pseudo-compiler to compile source code modules where the pseudo-compiler uses serial scheduling to operate two or more parallel compilers, the pseudo-compiler appears to the scheduler as a single compiler such that the scheduler triggers the pseudo-compiler to compile the source code modules, where the pseudo-compiler distributes the compile commands to the two or more parallel compilers so that each of the two or more parallel compilers has distributed to it at least one of the compile commands, the parallel compilers operating in parallel and independently of each other;
serially scheduling the serial compile commands in the parallel compilers to independently compile the source code modules such that each of the parallel compilers independently compiles respective source code modules in series, wherein serially scheduling comprises:
the scheduler sending a first compile command to the pseudo-compiler;
the pseudo-compiler triggering a first compiler to compile a first source code module based on the first compile command, and sending a first acknowledgment to the scheduler acknowledging that compiling of the first source code module is complete prior to actual completion of compiling of the first source code module;
the scheduler sending a second compile command to the pseudo-compiler only after receiving the first acknowledgment; and
the pseudo-compiler triggering a second compiler to compile a second source code module based on the second compile command;
compiling the source code modules in the parallel compilers to generate respective object code modules;
receiving from each parallel compiler an acknowledgment at a synchronizer, each acknowledgement indicating actual completion of the generation of the respective object code modules by respective parallel compilers; and
linking the object code modules in response to linker initiation commands received from the synchronizer.

2. The method of claim 1 wherein the pseudo-compiler stores the serial compiler commands in a buffer.

3. The method of claim 2 wherein the serial compiler commands are scheduled according to a size of the source code modules.

4. The method of claim 2 wherein the serial compiler commands are scheduled according to an expected compiler duration in each parallel compiler.

5. The method of claim 2 wherein the serial compiler commands are scheduled according to a next available compiler.

6. The method of claim 2 in which the serial compiler commands are scheduled according to a first-in-first-out scheme.

7. The method of claim 2 in which the serial compiler commands are scheduled according to a last-in-first-out scheme.

8. The method of claim 1 wherein the compiler completion acknowledgements indicate error-free compilations.

9. The method of claim 1 wherein the receiving further comprises storing a count of a serial compiler commands to determine a number of parallel compilers.

10. A computer-implemented method for controlling a building process of a target program, the building process compiling source code modules into object code modules and linking the object code modules to the target program, the method comprising:
receiving from a scheduler a plurality of triggers at a pseudo-compiler, each trigger for compiling a corresponding source code module of the source code modules according to a predefined serial schedule, where the pseudo-compiler appears to the scheduler as a single compiler, scheduler sending a first trigger and subsequently sending a second trigger;
acknowledging receipt of the first trigger by sending a first acknowledgment to the scheduler indicating that a first source code module has been compiled prior to actual completion of compiling the first source code module;
receiving from the scheduler the second trigger only after the scheduler receives the first acknowledgment;
triggering a plurality of independent compilers from the pseudo-compiler based on the first and second triggers to compile first and second source code modules to respective object code modules in parallel, where the pseudo-compiler serially triggers individual compilers for parallel code processing such that each individual compiler independently compiles the first and second source code modules in series, and where the pseudo-compiler distributes the compile commands according to a distribution schedule, the distribution schedule being based on two or more of a size of the source code modules, a first-in-first-out scheme, a last-in-first-out scheme, and a head or stack configuration;
sending from each of the compilers a respective acknowledgement to a synchronizer, each acknowledgment indicating that a particular source code module has actually been compiled; and
blocking a trigger from the scheduler to a linker until the synchronizer has received the acknowledgements from each of the independent compilers.

11. The method of claim 10 wherein a total number of triggerings for each source code module is counted and communicated to the synchronizer.

12. The method of claim 10 wherein the pseudo-compiler buffers triggering commands.

13. The method of claim 12 wherein the pseudo-compiler buffers triggering commands according to definitions selected from the group of size of the source modules to be compiled, an expected compiling duration for each compiler, a next available compiler, a first-in-first-out scheme, and a last-in-first-out scheme.

14. A computer program product, tangibly embodied in a machine-readable storage device, for generating an executable program, the computer program product being operable to cause data processing apparatus to:
receive from a scheduler compile commands, in serial order, in a pseudo-compiler to compile source code modules where the pseudo-compiler uses serial scheduling to operate two or more parallel compilers, the pseudo-compiler appears to the scheduler as a single compiler such that the scheduler triggers the pseudo-compiler to compile the source code modules, where the pseudo-compiler distributes the compile commands to the two or more parallel compilers so that each of the two or more parallel compilers has distributed to it at least one of the compile commands, the parallel compilers operating in parallel and independently of each other;
serially schedule the serial compile commands in the parallel compilers to independently compile the source code modules such that each of the parallel compilers independently compiles respective source code modules in series, wherein serially scheduling comprises:
the scheduler sending a first compile command to the pseudo-compiler;
the pseudo-compiler triggering a first compile to compile a first source code module based on the first compile command, and sending a first acknowledgment to the scheduler acknowledging that compiling of the first source code module is complete prior to actual completion of compiling of the first source code module;
the scheduler sending a second compile command to the pseudo-compiler only after receiving the first acknowledgment; and
the pseudo-compiler triggering a second compiler to compile a second source code module based on the second compile command;
compile the source code modules in the parallel compilers to generate object code modules;
receive from each parallel compiler an acknowledgment at a synchronizer, each acknowledgement indicating actual completion of the generation of the object code modules by respective parallel compilers; and
link the object code modules in response to linker initiation commands received from the synchronizer.

15. The product of claim 14 wherein the pseudo-compiler stores the serial compiler commands in a buffer.

16. The product of claim 15 wherein the serial compiler commands are scheduled according to a size of the source code modules.

17. The product of claim 15 wherein the serial compiler commands are scheduled according to an expected compiler duration in each parallel compiler.

18. The product of claim 15 wherein the serial compiler commands are scheduled according to a next available compiler.

19. The product of claim 15 in which the serial compiler commands are scheduled according to a first-in-first-out scheme.

20. The product of claim 15 in which the serial compiler commands are scheduled according to a last-in-first-out scheme.

21. A computer program product, tangibly embodied in a machine-readable storage device, for controlling a building process of a target program, the building process compiling source code modules into object code modules and linking the object code modules to the target program, the computer program product being operable to cause data processing apparatus to:
receive from a scheduler a plurality of triggers at a pseudo-compiler, each trigger for compiling a corresponding source code module of the source code modules according to a predefined serial schedule, where the pseudo-compiler appears to the scheduler as a single compiler, the scheduler sending a first trigger and subsequently sending a second trigger;

acknowledge receipt of the first trigger by sending a first acknowledgment to the scheduler indicating that a first source code module has been compiled prior to actual completion of compiling the first source code module;

receive from the scheduler the second trigger only after the scheduler receives the first acknowledgment;

serially trigger a plurality of independent compilers from the pseudo-compiler based on the first and second triggers to compile first and second source code modules to respective object code modules in parallel such that each of the independent compilers compiles the first and second source code modules in series, where the pseudo-compiler triggers individual compilers for parallel code processing, and where the pseudo-compiler distributes the compile commands according to a distribution schedule, the schedule being based on two or more of a size of the source code modules, a first-in-first-out scheme, a last-in-first-out scheme, and a head or stack configuration;

send from each of the compilers a respective acknowledgement to a synchronizer, each acknowledgment indicating that a particular source code module has actually been compiled; and block a trigger from the scheduler to a linker until the synchronizer has received the acknowledgements from each of the independent compilers.

22. The product of claim 21 wherein a total number of triggerings for each source code module is counted and communicated to the synchronizer.

23. The product of claim 21 wherein the pseudo-compiler buffers triggering commands.

24. The product of claim 23 wherein the pseudo-compiler buffers triggering commands according to definitions selected from the group of size of the source modules to be compiled, an expected compiling duration for each compiler, a next available compiler, a first-in-first-out scheme, and a last-in-first-out scheme.

* * * * *